(12) United States Patent
Kotta et al.

(10) Patent No.: US 9,990,319 B2
(45) Date of Patent: *Jun. 5, 2018

(54) PLACEMENT OF INPUT / OUTPUT ADAPTER CARDS IN A SERVER

(71) Applicant: International Business Machines Corporation, Armonk, NY (US)

(72) Inventors: Srinivas Kotta, Hyderabad (IN); Mehulkumar J. Patel, Bangalore (IN); Venkatesh Sainath, Bangalore (IN); Vaidyanathan Srinivasan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 34 days.

This patent is subject to a terminal disclaimer.

(21) Appl. No.: 15/094,329

(22) Filed: Apr. 8, 2016

(65) Prior Publication Data

US 2016/0224494 A1 Aug. 4, 2016

Related U.S. Application Data

(63) Continuation of application No. 14/310,396, filed on Jun. 20, 2014, now Pat. No. 9,361,143, which is a
(Continued)

(51) Int. Cl.
*G06F 9/445* (2018.01)
*G06F 13/38* (2006.01)
(Continued)

(52) U.S. Cl.
CPC ........ *G06F 13/385* (2013.01); *G06F 9/45533* (2013.01); *G06F 9/45558* (2013.01);
(Continued)

(58) Field of Classification Search
CPC .................................................. G06F 9/45533
(Continued)

(56) References Cited

U.S. PATENT DOCUMENTS 3,916,383 A 10/1975 Malcolm
5,914,481 A * 6/1999 Danielson ........... B60R 16/0231
235/462.15

(Continued)

FOREIGN PATENT DOCUMENTS

CN 1494691 A 5/2004
CN 104750631 A 7/2015

OTHER PUBLICATIONS

Horst, Robert W. "TNet: A reliable system area network." IEEE Micro 15.1 (1995): pp. 37-45.*

(Continued)

*Primary Examiner* — Satish Rampuria
(74) *Attorney, Agent, or Firm* — David B. Woycechowsky

(57) ABSTRACT

Tracking data transfers in an input/output adapter card system to determine whether the adapter cards are well-placed with respect to the components (for example dynamic random access memories) with which the adapter cards respectively are observed to communicate data. Some embodiments use a heuristic value for each adapter card in the system based on inter node transfers and intra node transfers, which are separately weighted and summed over some predetermined time interval in order to obtain the heuristic value.

4 Claims, 3 Drawing Sheets

Related U.S. Application Data continuation of application No. 14/141,494, filed on Dec. 27, 2013, now Pat. No. 9,304,799.

(51) Int. Cl.
  *G06F 9/455* (2018.01)
  *G06F 13/20* (2006.01)
  *G06F 13/40* (2006.01)
  *G06F 13/362* (2006.01)
  *G06F 13/42* (2006.01)

(52) U.S. Cl.
  CPC ............ *G06F 13/20* (2013.01); *G06F 13/362* (2013.01); *G06F 13/4022* (2013.01); *G06F 13/4081* (2013.01); *G06F 13/4282* (2013.01); *G06F 2009/45579* (2013.01)

(58) Field of Classification Search
  USPC .................................................... 717/1–108
  See application file for complete search history.

(56) References Cited

U.S. PATENT DOCUMENTS

| | | | |
|---|---|---|---|
| 6,529,976 B1 | 3/2003 | Fukuzawa et al. | |
| 6,725,401 B1* | 4/2004 | Lindhorst-Ko | H04J 14/0227 714/47.3 |
| 6,754,747 B2 | 6/2004 | Locklear et al. | |
| 6,779,177 B1 | 8/2004 | Bahrs | |
| 6,829,654 B1 | 12/2004 | Jungck | |
| 7,085,856 B2 | 8/2006 | Henderson et al. | |
| 7,237,139 B2 | 6/2007 | Hamilton, II et al. | |
| 7,287,099 B1 | 10/2007 | Powderly et al. | |
| 7,461,144 B1 | 12/2008 | Beloussov | |
| 8,359,415 B2 | 1/2013 | Brown et al. | |
| 8,433,611 B2 | 4/2013 | Lax | |
| 8,528,059 B1 | 9/2013 | Labana | |
| 9,304,799 B2 | 4/2016 | Kotta et al. | |
| 2002/0083111 A1* | 6/2002 | Row | G06F 17/30224 718/1 |
| 2004/0260857 A1 | 12/2004 | Henderson et al. | |
| 2005/0034027 A1 | 2/2005 | Hamilton, II et al. | |
| 2007/0038996 A1* | 2/2007 | Ben-Yehuda | G06F 13/105 718/1 |
| 2010/0161872 A1 | 6/2010 | Daniel | |
| 2011/0154351 A1* | 6/2011 | Henderson | G06F 9/5027 718/104 |
| 2015/0186323 A1 | 7/2015 | Kotta et al. | |

OTHER PUBLICATIONS

Biagioni, Edoardo, Eric Cooper, and Robert Sansom. "Designing a practical ATM LAN." IEEE Network 7.2 (1993): pp. 32-39.*

Moll, Laurent, Alan Heirich, and Mark Shand. "Sepia: scalable 3D compositing using PCI Pamette." Field-Programmable Custom Computing Machines, 1999. FCCM'99. Proceedings. Seventh Annual IEEE Symposium on. IEEE, 1999. pp. 1-10.*

Desai et al., "BladeCenter system overview", IBM Journal of Research and Development 49.6 (2005), pp. 809-821.

Kotta et al., "Placement of Input / Output Adapter Cards in a Server", U.S. Appl. No. 15/008,678, filed Jan. 28, 2016.

Minkenberg et al., "Adaptive Routing in Data Center Bridges", 17th IEEE Symposium on High Performance Interconnects, 2009, IEEE, pp. 33-41.

Sinha, Alok, "Client-server computing", Communications of the ACM 35.7 (1992) pp. 77-98.

"Method to select home node for logical partitions based on characteristics of memory devices attached to host processors", An IP.com Prior Art Database Technical Disclosure, Authors et. al.: Disclosed Anonymously, IP.com No. IPCOM000222903D, IP.com Electronic Publication: Oct. 29, 2012.

Agrawal, Prathima, et al. "SWAN: A mobile multimedia wireless network." IEEE Personal Communications 3.2 (1996): pp. 18-33.

Bellows, Peter, et al. "GRIP: A reconfigurable architecture for host-based gigabit-rate packet processing." Field-Programmable Custom Computing Machines, 2002. Proceedings. 10th Annual IEEE Symposium on. IEEE, 2002. pp. 1-10.

Lim, Y-X., et al. "Wireless intrusion detection and response." Information Assurance Workshop, 2003. IEEE Systems, Man and Cybernetics Society. IEEE, 2003. pp. 68-75.

* cited by examiner

PLACEMENT OF INPUT / OUTPUT ADAPTER CARDS IN A SERVER

BACKGROUND OF THE INVENTION

The present invention relates generally to the field of I/O (input/output) adapter cards, and more particularly to the placement of I/O adapter cards.

Computer systems (such as blade servers) can be made to run more effectively and/or efficiently by "offloading" certain repetitive tasks to processing hardware other than the CPU (central processing unit). Certain hardware dedicated to perform these repetitive tasks is known as accelerator cards and/or adapter cards (collectively herein called cards). Cards are removably insertable from input/out (I/O) slots. Typically, these cards are used for encryption, compression, or custom algorithms and are placed in a PCI (peripheral component interconnect) or PCIe (peripheral component interconnect express) slot.

PCIe is a high-speed serial computer expansion bus standard. PCIe operates in consumer, server, and industrial applications, as: (i) a motherboard level interconnect (to link motherboard-mounted peripherals; (ii) a passive backplane interconnect; and (iii) as an expansion card interface for add-in boards. Differences in electrical signaling and bus protocol require the use of a different mechanical form factor and expansion connectors. New motherboards and new adapter boards are required for PCIe, and thus, PCI (peripheral component interconnect) slots and PCIe slots are not interchangeable. At the software level, PCIe preserves backward compatibility with PCI. Legacy PCI system software can detect and configure newer PCIe devices without explicit support for the PCIe standard, although PCIe's new features are inaccessible.

In a typical multi-socket processor server configuration, processors in both sockets offer PCIe slots where adapters or accelerator cards can be placed. However, based on the system configuration, each of the sockets may have different types of memory devices connected to them. Such multi-processor and multi-PCIe slot configurations are common when a server computer is built-to-order, and where the requirements for different types of memory devices are based on the read/write requirements of the workloads placed on the servers. Home node for the workload can be decided on: (i) based on the memory read/write heuristics of the workload; and/or (ii) by mapping the memory configuration associated with each processor.

SUMMARY

According to an aspect of the present invention, there is a method, computer program product and system for use with a computer system including input/output (I/O) adapter cards (see definition, below). The method includes the following steps (not necessarily in the following order): (i) for each data communication between a first input/output (I/O) adapter card of a plurality of I/O adapter cards in a computer system and a virtual machine of a plurality of virtual machines in the computer system, determining a number of inter node interfaces N1 crossed in making the data communication; and (ii) for each data communication between the first I/O adapter card and a virtual machine, determining a number of intra node interfaces N2 crossed in making the communication.

DETAILED DESCRIPTION

Figure 1:
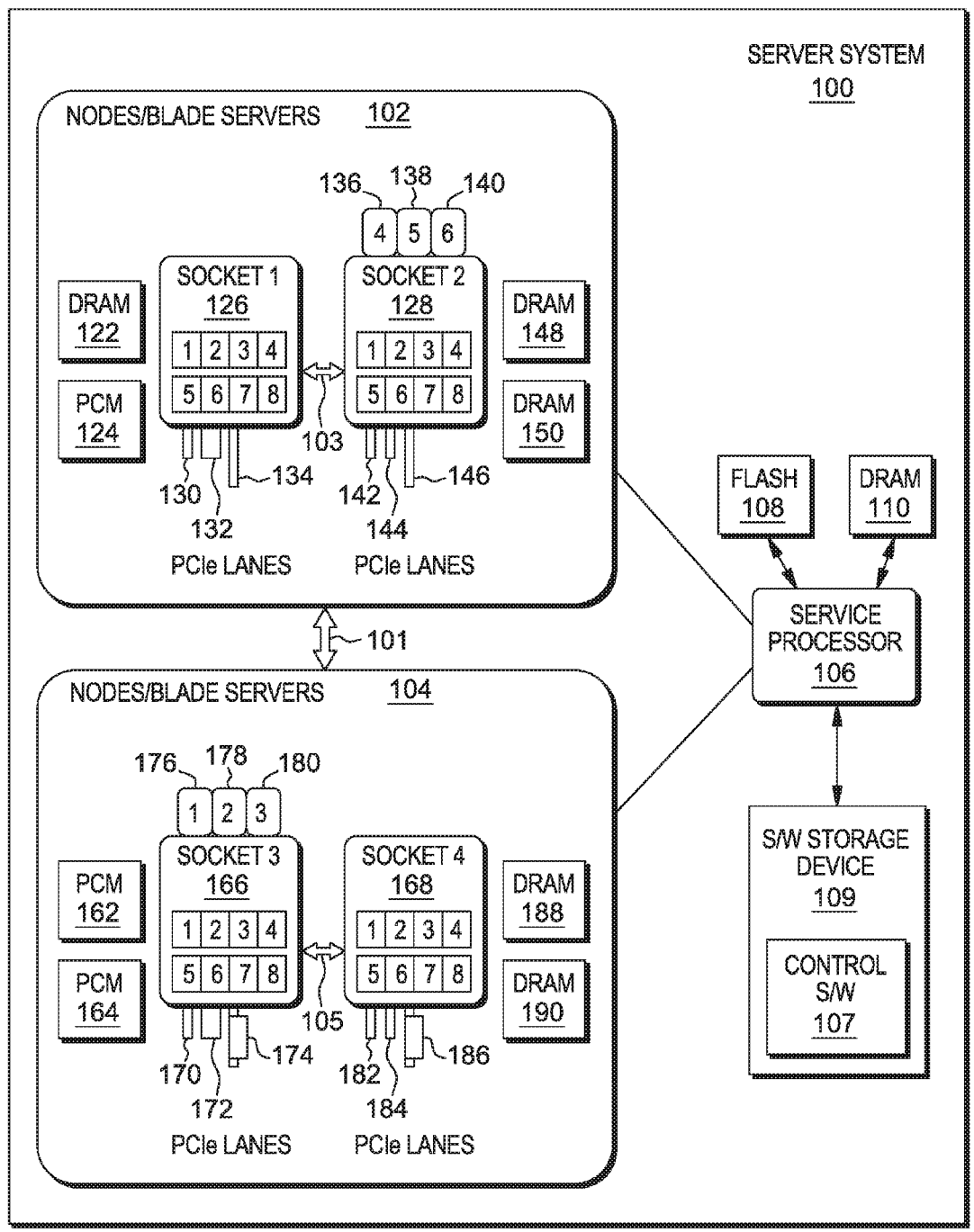
FIG. 1 is a block diagram of a first embodiment of a server system according to the present invention.

Some embodiments of the present disclosure recognize that it can be difficult to optimally place cards in I/O slots. More specifically on this point, some embodiments recognize the following: (i) a server's "home node" for each workload is decided at run-time; (ii) the accelerator card placement location is selected when assembling the server; (iii) accelerator card placement options increase when the server has multiple processor sockets, when the server has multiple nodes, and/or when each processor socket is associated with multiple PCIe slots; (iv) the foregoing four items may cause sub-optimal accelerator card placements in server computers; (v) potential sub-optimal accelerator card placement problems also exist within blade servers operating in SMP (symmetric multiprocessing) configuration (for example, when users do not place the I/O adapter or accelerator cards in locations corresponding to appropriate ITEs (information technology elements) and the workloads for these cards are scheduled by the hypervisor); (vi) if the I/O adapter or accelerator cards are not present in the same ITEs/nodes where the workload is being executed most often, an inherent latency exists where the workload has to be moved over the chassis interconnect to the other ITEs to access the cards; (vii) optimal card placement takes into consideration the server configuration, accelerator requirements of the workload, and the home-nodes of each workload executed on the server; (viii) in most high end systems, hot plug operations are allowed from the OS (operating system) side; (ix) in most high end systems, I/O is not fixed to the planar, which means that to change the position of cards in the I/O slots, system IPL (initial program load) is not required.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 shows system 100 including: inter node bus (also called inter node interface) 101; first nodes/blade servers (also called first drawer) 102; second nodes/blade servers (also called second drawer) 104; service processor 106; control software 107; flash memory 108; software storage device 109; and dynamic random access memory (DRAM) 110. First drawer 102 includes: intra node bus (also called intra node interface) 103; DRAMs 122, 148, 150; phase change memory (PCM 124); first socket 126; second socket 128; PCIe slots 130, 134, 142, 144, 146; input/output (I/O) adapter card 132; and virtual machines ("VMs," see definition of "virtual machine," below) 136, 138, 140. Second drawer 104 includes: intra node bus (also called intra node interface) 105; DRAMs 188, 190; PCMs 162, 164; third socket 166; fourth socket 168; PCIe slots 170, 172, 184; input/output (I/O) adapter cards 174, 182, 186; and VMs 176, 178, 180.

System 100 includes sockets 126, 128, 166, 168 that have host processors having integrated PHB (PCI host bridge) units. The PHB units provide multiple PCIe slots with (x16) or (x8) widths. The PHB units provide statistics about "inter node" and "intra node" accesses involved for each data transfer. This information is used by control software 107 to recommend when a card should be moved to a different card location.

A First Example Algorithm ("FEA") for determining when to recommend that an adapter card be moved is as follows: (i) determine the number N1 of inter node interfaces 101 crossed when an I/O adapter card 132, 174, 186 communicates with a destination memory buffer (the memory buffers are not separately shown in FIG. 1—they reside in the DRAMs or PCMs attached to the processor); (ii) determine the number N2 of intra node interfaces 103, 105 crossed when an I/O adapter card 132, 174, 186 communicates with a destination memory buffer; (iii) calculate a heuristic value H (further explained below) as a moving average across a window of t units of time for each adapter card; (iv) when the moving average of heuristic value H exceeds a given threshold value T1 for a given I/O adapter card, as value H moves back and forth over time, then a dedicated variable N4 for that given I/O adapter card is incremented; and (v) when N4 for any adapter card exceeds threshold value T2, then a recommendation is sent to the systems management console prompting the user to move that I/O adapter card to a different location (such as, the "closest possible location").

To further explain step (i) of the FEA, the concept of "crossing an interface" will now be explained. In a multi-node SMP box, nodes 102, 104 can be interconnected in many different ways, such as by a mesh connection or by a ring connection. Each node 102, 104 houses multiple processor chips, such as the processor chips in sockets 126, 128, 166 and 168. These processor chips are generally connected in mesh connection. Each processor chip includes an I/O hub. All adapter cards 132, 174, 186 are behind the I/O hub of the processor chip of the respective socket into which the adapter card is plugged. When DMA (direct memory access) is initiated by an adapter card 132, 174, 186, depending upon location of the destination memory buffer, data may have to travel one or both of the following: (a) one or more inter node buses 101; and (b) an intra node bus 103, 105 (assuming mesh connected processor chips).

To further explain step (iii) of the FEA, the heuristic value is calculated at follows:

$$H=(x*N2*N3)+(y*N1*N3) \quad \text{(Equation 1)}$$

where: (a) x and y are weighting factors provided by the system designer; and (b) N3 is the volume of the total data sent/received from the I/O adapter card (in this case N3 is measured in gigabytes).

To further explain step (v), the "closest possible location" is the location closest to the processor where the DMA operation originated, thereby reducing the number of intra and inter node interfaces that need to be hopped. The FEA maintains the heuristic value H for each VM and each I/O adapter card, so that control software can identify the optimal and appropriate slot to which to move a particular I/O adapter card. The destination buffer is in one of either DRAM or PCM devices connected to the host processor where the VM is executing. DMA is between the I/O adapter and the destination buffer in DRAM or PCM. The I/O adapters can be shared by multiple VMs. Hence, a heuristic is maintained for each VM. Using this heuristic, the software which VM will benefit the most by moving the adapter to a closer location.

In other words, the relative frequency with which each adapter card will communicate with each VM is not known in advance. However, the amount of interface crossing performed in making these communications is effectively tracked over time by the heuristic values H and N4 values respectively assigned to each I/O adapter card. When a particular I/O adapter card is observed to require a relatively large amount of interface crossing to make its communications, then control software 107 makes a recommendation to move that I/O adapter card.

System 100 includes multiple VMs 136, 138, 140, 176, 178, 180 on different sockets 128, 166 across two nodes 102, 104. In operation, any of these VMs may access any of the I/O adapter cards 132, 174, 186 that are present in system 100. System 100 uses SRIOV (single root I/O virtualization) adapter or a virtualized I/O adapter in VIOS (virtual I/O Server). Depending upon the above algorithm, a "highest-rated VM" is the VM that gets the greatest number of candidate markings for the I/O adapter cards. More specifically, there can be scenarios where VMs are scheduled on different processors in a server but the VMs may be sharing the same I/O adapter card. In these cases, there will be conflicts regarding moving the adapter closer to one of the VMs. In order to resolve this conflict, control software 107 monitors the usage of each I/O adapter card by each VM. A VM that sends and/or receives a relatively large amount of data from a given I/O adapter card and has to cross more inter node and intra node interfaces to communicate with that I/O adapter card becomes a candidate for determining the socket to which it is optimal to move that given I/O adapter card. In response to this determination of highest rated VM, a PHYP (POWER hypervisor, or any other type of hypervisor) included in control software 107 recommends moving that given I/O adapter card closer to the highest rated VM. More specifically, the hypervisor's recommendation is sent to a Graphical User Interface so that a user can see the recommendation and respond with appropriate action.

Figure 2:
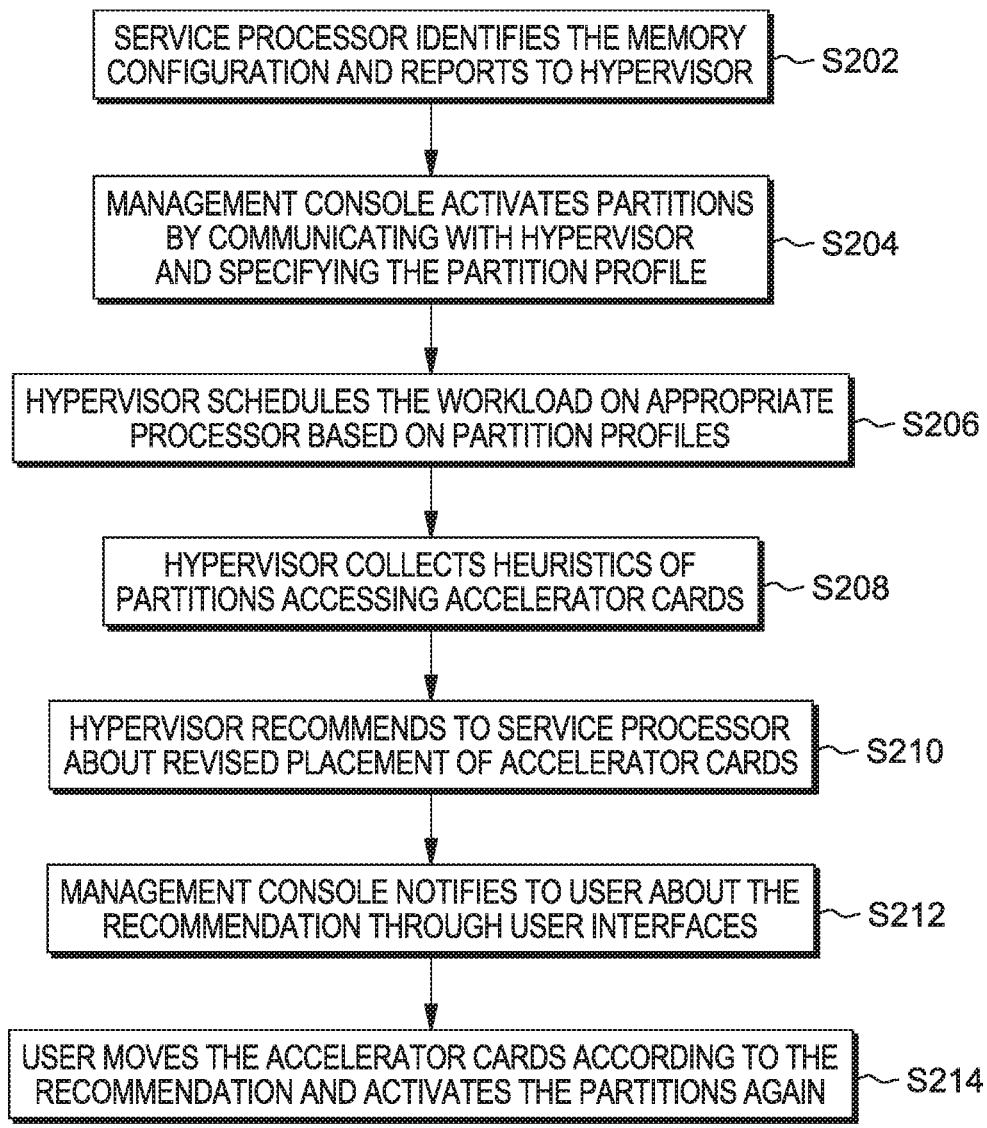
FIG. 2 is a flowchart of a method according to the present invention performed, at least in part, by the first embodiment server system.

As shown in FIG. 2, flow chart 200 is a method for recommending the moving of I/O adapter cards according to the present invention. FIG. 2 shows the content of each step involved in this method and the process flow between the steps. More specifically, flow chart 200 includes steps S202, S204, s206, S208, S210, S212, and S214.

Figure 3:
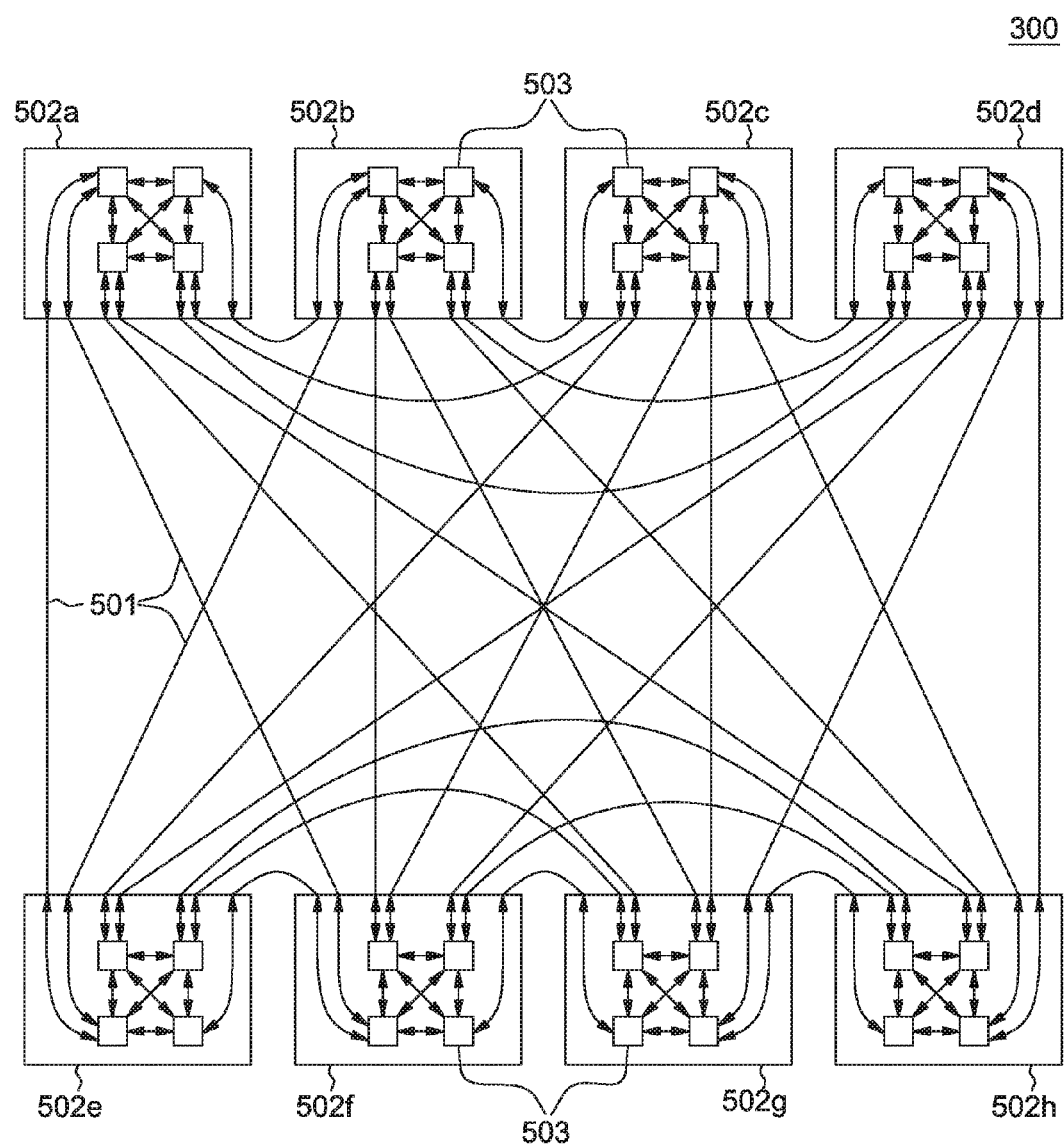
FIG. 3 is a block diagram of a second embodiment of a server system according to the present invention.

System 100, discussed above in connection with FIG. 1 is a relatively simple embodiment of the present invention. As shown in FIG. 3, server system 300 is a more complex system, with: (i) more nodes 502a, b, c, d, e, f, g and h; (ii) more interfaces between processors 503 within the nodes; and (iii) more interfaces 501 between the nodes. This more complex embodiment helps to demonstrate why it can be helpful to have software and algorithms for determining recommended I/O adapter card placement.

Some embodiments of the present disclosure may include one, or more, of the following features, characteristics and/or advantages: (i) a method to recommend the appropriate slot location (for example, PCI slot, PCIe slot) for the placement of accelerator cards, in proximity to a specific processor in a multi-socket, multi-drawer, multi-node server configuration; (ii) a method to implement instrumentation in HW (hardware) to gather statistics and to understand the data flow between various memory devices and I/O cards present in the system; (iii) avoidance of latency for the workload in accessing the accelerator cards and PCIe cards in general; (iv) optimization of the nodes/chassis interconnect bandwidth usage; and/or (v) optimization of hardware placement within the servers.

The following paragraphs set forth some definitions.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Electrically Connected: means either directly electrically connected, or indirectly electrically connected, such that intervening elements are present; in an indirect electrical connection, the intervening elements may include inductors and/or transformers.

Mechanically connected: Includes both direct mechanical connections, and indirect mechanical connections made through intermediate components; includes rigid mechanical connections as well as mechanical connection that allows for relative motion between the mechanically connected components; includes, but is not limited to, welded connections, solder connections, connections by fasteners (for example, nails, bolts, screws, nuts, hook-and-loop fasteners, knots, rivets, quick-release connections, latches and/or magnetic connections), force fit connections, friction fit connections, connections secured by engagement caused by gravitational forces, pivoting or rotatable connections, and/or slidable mechanical connections.

Software storage device: any device (or set of devices) capable of storing computer code in a manner less transient than a signal in transit.

Tangible medium software storage device: any software storage device (see Definition, above) that stores the computer code in and/or on a tangible medium.

Non-transitory software storage device: any software storage device (see Definition, above) that stores the computer code in a non-transitory manner.

Computer: any device with significant data processing and/or machine readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, application-specific integrated circuit (ASIC) based devices.

User: includes human and machine-based users; for example, a user could be a robot capable of moving I/O adapter cards.

Intermittently: repeatedly over time; repetition does not have to be at regular time intervals.

Virtual machine: any set of software, hardware and/or firmware that one of ordinary skill in the art would regard, or will come to regard as a virtual machine; in one example, a "virtual machine" will physically take the form of a portion of a larger memory (for example, volatile memory) and the data stored in that portion of the memory.

Input/output (I/O) adapter card: includes any and all kinds of removably insertable adapter cards that can perform DMA (direct memory access) to host memory; includes, but is not limited to, accelerator cards.

What is claimed is:

1. A method performed by a machine using machine logic, the method comprising:
   for each data communication between a first input/output (I/O) adapter card of a plurality of I/O adapter cards located in a first adapter card location in a computer system and a virtual machine of a plurality of virtual machines in the computer system, determining a number of inter node interfaces N1 crossed in making the data communication;
   for each data communication between the first I/O adapter card and a virtual machine, determining a number of intra node interfaces N2 crossed in making the data communication determining that the number of intra node interfaces N2 crossed in making the data communication exceeds the number of inter node interfaces N1; and
   making a recommendation to move the first I/O adapter card from the first adapter card location to a second adapter card location based, at least in part, upon the determination that the number of intra node interfaces N2 crossed in making the data communication exceeds the number of inter node interfaces N1;
   wherein the recommendation is made when, over time, a heuristic value H for the first I/O adapter card exceeds a first predetermined threshold value T1 a number of times N4 that exceeds a second predetermined threshold value T2.

2. The method of claim 1 further comprising:
   for each data communication between the first I/O adapter card and a virtual machine, determining the amount of data, N3, communicated.

3. The method of claim 2 further comprising: intermittently calculating the heuristic value H for the first I/O adapter card based, at least in part, on the N1, N2 and N3 values for at least some of the data communications between the first I/O adapter card and the virtual machines with which the first I/O adapter card communicates.

4. The method of claim 3 further comprising:
   making a recommendation to move the first I/O adapter card to a slot associated with a different processor based, at least in part, on heuristic value H for the first I/O adapter card.

* * * * *